United States Patent [19]

Carpenter

[11] 4,094,087
[45] June 13, 1978

[54] FISHING LURE AND HOOK

[76] Inventor: Jerry W. Carpenter, 713 Western Ave., Orange, Tex. 77630

[21] Appl. No.: 765,571

[22] Filed: Feb. 4, 1977

[51] Int. Cl.² ............................................. A01K 85/00
[52] U.S. Cl. .................................................. 43/42.24
[58] Field of Search ..................... 43/41, 42.1, 42.08, 43/42.24, 42.26, 42.27, 42.28, 42.37, 42.38, 42.41

[56] References Cited

U.S. PATENT DOCUMENTS

| | | | |
|---|---|---|---|
| 2,241,367 | 5/1941 | Sarff | 43/42.1 |
| 3,465,466 | 9/1969 | Showalter | 43/42.24 |
| 3,685,197 | 8/1972 | McClellan | 43/42.24 |
| 3,724,116 | 4/1973 | Lindner et al. | 43/44.8 |
| 3,978,606 | 9/1976 | Riggs | 43/42.37 |

Primary Examiner—Jay N. Eskovitz
Assistant Examiner—Robert P. Swiatek
Attorney, Agent, or Firm—Fulbright & Jaworski

[57] ABSTRACT

A combination of a fishing lure and a fishing hook is disclosed in which the leading end of the lure body is formed of a flexible plastic material and is restrained from moving down the shank of the hook when the fishing lure is pulled through the water and strikes some object, allows the lure body to remain in a straight, full-length position on the hook which makes the lure a more effective lure for attracting fish, does not require the fisherman to take time to continually readjust the lure on the hook after casting and subsequent withdrawal of the lure and hook from the water, and increases the usable life of the lure, since no tearing of the lure body occurs from sliding on the hook. The lure body may be in any desired form or shape, such as a worm, or other creature used for bait.

4 Claims, 3 Drawing Figures

FISHING LURE AND HOOK

BACKGROUND OF THE INVENTION

Flexible plastic fishing lures, such as plastic worms, are used in fishing to provide fishing bait having live action in the water. In prior plastic lures, the lure body slides down the shaft of the fishing hook each time an object is struck by the lure, the lure does not remain in a straight, full-length position on the hook, but rather becomes crumpled and wrinkled, thereby losing its effectiveness as a fishing lure to attract fish, the fisherman is required to readjust and straighten the plastic worm on the hook after retrieval of the lure from the water, and the movement of the lure body on the hook causes the plastic lure body to become torn, thereby shortening the usable life of the lure.

There have been a number of proposals for artificial fish lures and baits. Among them are artificial fish lures and bait as disclosed in the following U.S. Pat. Nos. 2,563,522; 2,603,025; 2,979,850; 2,521,616; 3,070,917; 3,147,564; 3,165,858; 3,449,853; and 3,505,755. None of the artificial fish lures or baits disclosed in these patents or artificial fish lures available on the market overcome the foregoing objections and disadvantages of artificial fishing lures and bait as set forth in the preceding paragraph.

SUMMARY OF THE INVENTION

The present invention is directed to the combination of an artificial fishing lure or bait and hook which overcomes the foregoing disadvantages.

Accordingly, it is an object of the present invention to provide an artificial plastic fishing lure in combination with a fishing hook in which the lure body is prevented from sliding down on the shank or shaft of the fishing hook when the lure or bait strikes some object or as it is pulled through the water.

A further object of the present invention is the provision of an artificial plastic fishing lure or bait in combination with a hook in which the lure body remains in a straight, full-length position on the hook which makes the lure or bait more effective for attracting fish.

A further object of the present invention is the provision of an artificial plastic fishing lure or bait in combination with a fishing hook in which is it unnecessary for the fisherman to readjust the lure body on the hook after casting and subsequent withdrawal of the lure body from the water.

A further object of the present invention is the provision of an inexpensive plastic fishing lure or bait in combination with a hook in which there is no tearing of the plastic body of the lure or bait due to movement along the shaft or shank of the fishing hook, thereby increasing the usable life of the lure or bait.

Other and further objects, features and advantages will appear throughout the specification, drawings and claims.

The foregoing objects, ends and advantages are obtained by the present invention in providing a lure body made of a flexible, plastic material, inert to water, in the shape of a worm or other bait-like creature, with a fibrous insert imbedded in the leading end of the lure through which a fishing hook provided with barbs adjacent and pointing generally to the eye of the fishing hook are imbedded with the point of the hook imbedded in the plastic fishing lure body. The barbs and fibrous material prevent the leading end of the lure body from sliding down the shaft, which would be the case in the event fibrous material and barbs were not provided. Also, the point of the fish hook is unimpaired to hook the fish since it is not in the fibrous material, but in the plastic lure body. If desired, a nose piece is provided which has a pocket receiving the eye of the fishing hook and an axially-extending opening through the nose piece for the fishing line.

DESCRIPTION OF PREFERRED EMBODIMENTS

The fishing lure 8 includes a lure body 10 formed of a flexible, tough plastic material, which is inert to water, and of a shape to simulate bait in water, such as worms, eels, minnows, and other bait-like animals and creatures. Any plastic material which is flexible and tough and inert to water can be used, of which many are available on the market, and, accordingly, no detailed description thereof is deemed necessary. The lure body 10 in the embodiment shown, is an elongated body simulating a worm; although, as previously mentioned, it can simulate any bait and preferably should be flexible enough to have "live" action when being pulled through the water.

Figure 2:
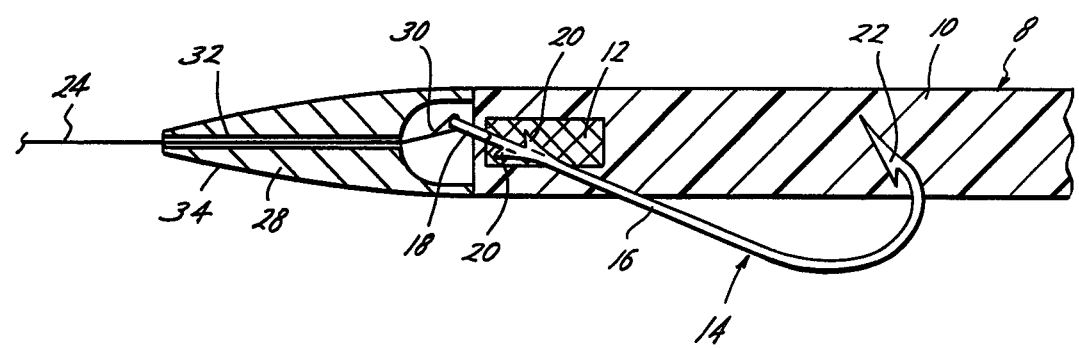
FIG. 2 is a fragmentary side sectional view of the the fishing lure and hook of FIG. 1.
Figure 3:
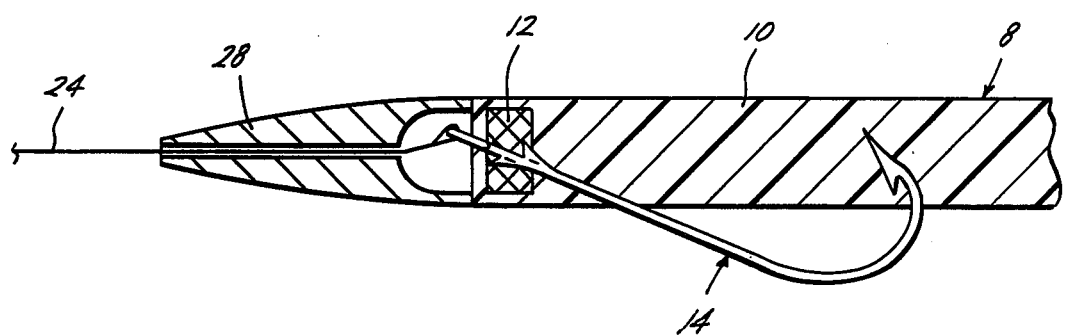
FIG. 3 is a view similar to that of FIG. 2, but illustrates a modification.

Imbedded in the leading end of the lure body 10 is a small amount of a fibrous material 12. The fibrous material may be fibers, and may be braided, knotted, a web or mesh of any desired fibers, such as nylon, orlon acrylic knitting yarn, bristles, natural fibers and the like. The fibers imbedded in the leading end of the lure body 10 may be molded into place when molding the plastic or may be inserted later, such as with a needle, pulling yarn into the lure body, and the like. The fibers may be disposed in an axial (FIG. 2) or transverse (FIG. 3) direction, and may be in the shape of a generally elongated rectangular mass, or may be square, round of or other shapes. It is essential, however, that the fibers 12 be disposed only in the leading end of the lure body 10 so that the hook of the fishing hook is disposed only in the plastic lure body and not in the fibers so that the hook will be free to hook in the fish's mouth, as later described.

Figure 1:
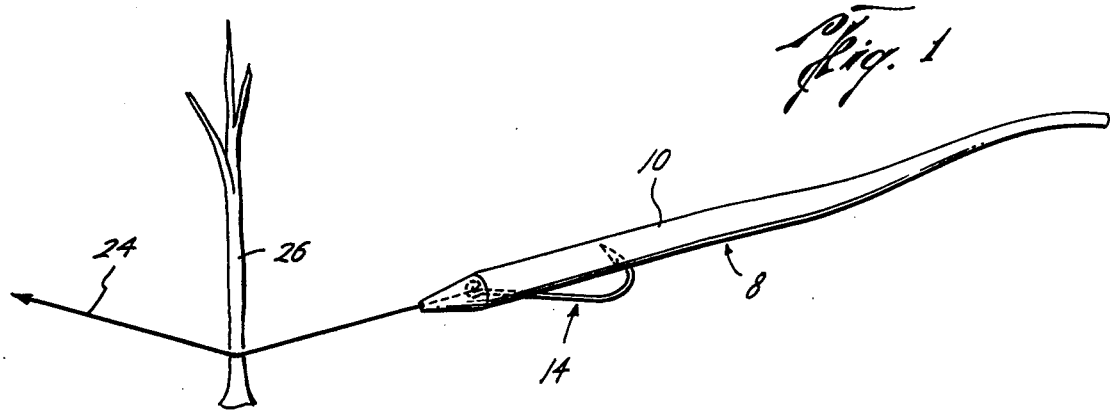
FIG. 1 is a perspective view of a fishing lure and fishing hook combination according to the invention shown in use in water.

The hook 14 includes a shaft or shank 16, an eye 18 on its leading end, the barbs 20 generally extending or pointing in a direction of the eye 18 and the fish hook 22. The fishing hook 14 is placed in the fish lure by pushing the hook 22 and the shaft or shank 16 through the leading end of the lure body 10 and the fibers 12 until the barbs 20 are within the fibers 12 and the eye 18 is disposed adjacent the leading end of the lure body 10. The fish hook 22 is then inserted into the plastic lure body 10, and, since it is not disposed within the fibers 12, is free from any impediments or restraints from hooking the fish. The fishing line 24 is secured to the eye 18 by which the lure 8 and fish hook are 14 are pulled through the water and the barbs 20 prevent the forward end of the lure body 10 from sliding down the shank as the lure 8 is being pulled through the water and particularly when it engages an obstruction, such as indicated at 26 in FIG. 1.

If desired, a nose piece 28 provided with the pocket 30 may be provided at the leading end of the lure body 10 so that the eye 18 of the fish hook 14 is disposed within that pocket, which nose piece 28 is provided with the axially-extending passage 32 through which the fishing line 24 extends. Preferably, the outer body wall is tapered inwardly towards its leading end as indicated at 34 to provide smooth pull of the lure through the water and to assist in pulling it through obstructions, such as indicated at 26, and the like. While the nose piece does provide a distinct advantage, it may be omitted if desired.

In use, the fish lure 8 and fish hook 14 are combined as illustrated and previously described. In casting the lure 8 and fish hook 14 and pulling it through the water by the line 24, the leading end of the lure body 10 is prevented from sliding down the shank 16 of the fish hook 14 by the coaction of the imbedded fibers 12 and barbs 20, thereby minimizing tearing of the lure body 10 and extending the usable life thereof, the lure 8 is permitted to remain in a straight, full-length position on the fish hook 14 which makes it more effective for attracting fish, it is unnecessary to adjust the lure 8 on the hook 14 after casting and subsequent withdrawal of the lure 8 and hook 14 from the water, and yet the hook 22 of the fish hook 14 is not restrained from hooking the fish as it would be if it were imbedded in fibers such as indicated at 12.

Accordingly, the present invention is well suited and adapted to attain the objects and ends, meet the objects and have the advantages mentioned, as well as others inherent therein.

While presently preferred embodiments of the invention have been given for the purpose of disclosure, changes may be made therein which are within the spirit of the invention as defined by the scope of the appended claims.

What is claimed is:

1. The combination of a fishing lure and a fishing hook,
   the fishing hook comprising:
   an eye for attachment to a fishing line,
   a shank,
   a hook, and
   at least one barb on the shank adjacent and extending toward the eye,
   the fishing lure comprising:
   a lure body of flexible, plastic material inert to water simulating bait and having action in the water, and
   a fibrous material embedded within the leading end of the lure body; and
   the shank of the fishing hook extending through the leading end of the lure body,
   the barb disposed within the fibrous material, and
   the hook hooked into the plastic material of the lure body downstream from the fibrous material,
   whereby, the lure body is restrained by the barb within the fibrous material from movement away from the eye and down the shank of the fishing hook as the fishing lure and hook are pulled through the water by the fishing line.

2. The invention of claim 1, where,
   the lure body is molded and the fibrous material is molded within the leading end of the lure body.

3. The invention of claim 1, including,
   a nosepiece at the leading end of the lower body provided with a pocket at its trailing end receiving the eye of the fishing hook, and
   a passage extending axially from the pocket to the nosepiece's leading end receiving the fishing line,
   the nosepiece's outer wall being inwardly tapered toward its leading end.

4. The invention of claim 2, including,
   a nosepiece at the leading end of the lower body provided with a pocket at its trailing end receiving the eye of the fishing hook, and
   a passage extending axially from the pocket to the nosepiece's leading end receiving the fishing line,
   the nosepiece's outer wall being inwardly tapered toward its leading end.

* * * * *